United States Patent
Sekiya et al.

(10) Patent No.: US 9,134,536 B2
(45) Date of Patent: Sep. 15, 2015

(54) HEAD-UP DISPLAY DEVICE

(75) Inventors: Shun Sekiya, Niigata (JP); Makoto Hada, Niigata (JP); Tsuyoshi Nakahara, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 54 days.

(21) Appl. No.: 14/130,877

(22) PCT Filed: Jun. 8, 2012

(86) PCT No.: PCT/JP2012/064756
§ 371 (c)(1),
(2), (4) Date: Jan. 3, 2014

(87) PCT Pub. No.: WO2013/005525
PCT Pub. Date: Jan. 10, 2013

(65) Prior Publication Data
US 2014/0152711 A1    Jun. 5, 2014

(30) Foreign Application Priority Data
Jul. 6, 2011   (JP) .................................. 2011-149632

(51) Int. Cl.
*G02B 27/01*   (2006.01)
*B60K 35/00*   (2006.01)
(Continued)

(52) U.S. Cl.
CPC ............ *G02B 27/0101* (2013.01); *B60K 35/00* (2013.01); *G02B 26/10* (2013.01);
(Continued)

(58) Field of Classification Search
CPC ...... G02B 27/0101; G02B 5/30; G02B 27/01; G02B 2027/0118; G02B 26/10; B60K 35/00; B60K 2350/2052; G09G 2320/0626; G02F 1/13306; G02F 2001/133626; H04N 9/3129; H04N 9/3182; H04N 9/3185; H04N 9/3194
See application file for complete search history.

(56) References Cited

U.S. PATENT DOCUMENTS

| 5,214,413 A | 5/1993 | Okabayashi et al. |
| 6,011,643 A | 1/2000 | Wunderlich et al. |

(Continued)

FOREIGN PATENT DOCUMENTS

| JP | H02-257124 A | 10/1990 |
| JP | 5-193400 | 8/1993 |

(Continued)

OTHER PUBLICATIONS

International Search Report PCT/JP2012/064756 dated Jul. 3, 2012.
(Continued)

*Primary Examiner* — Andrew Sasinowski
(74) *Attorney, Agent, or Firm* — McDermott Will & Emery LLP

(57) ABSTRACT

Provided is a heads-up display device that stably achieves a low brightness display in which the display does not feel too bright in a dark environment at night, which further does not give a vehicle driver discomfort with continuous changes in brightness, and which has excellent white balance in the entire range of display brightness. A heads-up display device (1) is provided with an external light illuminance detection section (70) that detects the illuminance of external light and adjusts the display brightness (B) for display of images, which are displayed, on the basis of external light illuminance (P) measured by the external light illuminance detection section (70). The heads-up display device (1) is further provided with a display brightness adjusting means (81*a*) that adjusts the display brightness (B) of the display image to a low level when a display image is displayed in a low brightness region that is lower than a prescribed brightness by controlling the polarization angle of a polarized light control element (11) and adjusting the transmittance (Z) for laser light (R, G, B) in a polarized light section (14).

13 Claims, 13 Drawing Sheets

(51) Int. Cl.
*G02B 26/10* (2006.01)
*G03B 21/00* (2006.01)
*H04N 9/31* (2006.01)
*G02B 5/30* (2006.01)
*G02F 1/133* (2006.01)
*G02F 1/1335* (2006.01)

(52) U.S. Cl.
CPC .............. *G02B 27/01* (2013.01); *G03B 21/00* (2013.01); *H04N 9/3129* (2013.01); *H04N 9/3182* (2013.01); *H04N 9/3185* (2013.01); *H04N 9/3194* (2013.01); *B60K 2350/2052* (2013.01); *G02B 5/30* (2013.01); *G02B 2027/0118* (2013.01); *G02F 1/13306* (2013.01); *G02F 2001/133626* (2013.01); *G09G 2320/0626* (2013.01)

(56) References Cited

U.S. PATENT DOCUMENTS 6,653,989 B2 * 11/2003 Nakanishi .......................... 345/7
2009/0153454 A1 6/2009 Irie et al.
2009/0232175 A1 9/2009 Sudo
2012/0050139 A1 * 3/2012 Wang et al. ...................... 345/7

FOREIGN PATENT DOCUMENTS

| JP | 7-270711 | 10/1995 |
| JP | 2007-065012 A | 3/2007 |
| JP | 2008-216560 A | 9/2008 |
| JP | 2009-218419 A | 9/2009 |
| JP | 2010-107615 A | 5/2010 |
| JP | 2010-134360 A | 6/2010 |
| JP | 2011-112754 A | 6/2011 |
| WO | 2007/052381 A1 | 5/2007 |

OTHER PUBLICATIONS

Office Action Japanese Patent Application No. 2011-149632 dated Apr. 7, 2015.
Supplementary European Search Report EP Application No. 12 80 7129 dated Apr. 23, 2015.

* cited by examiner

Fig.5
(a)
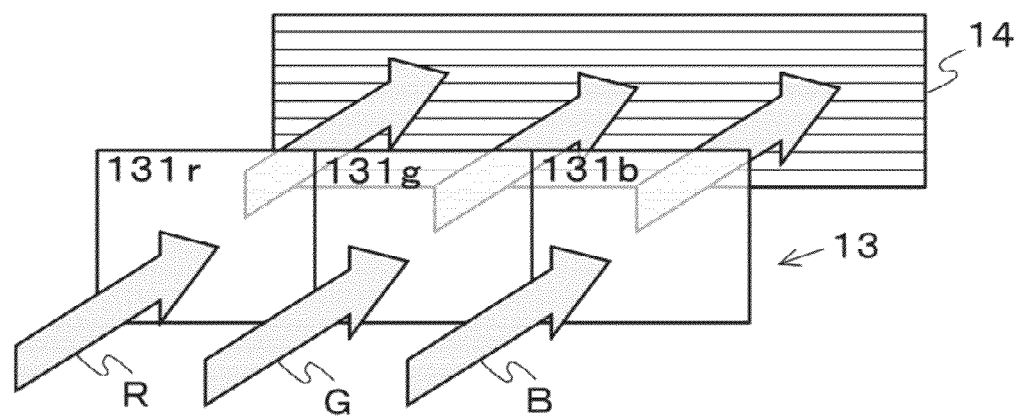
(b)
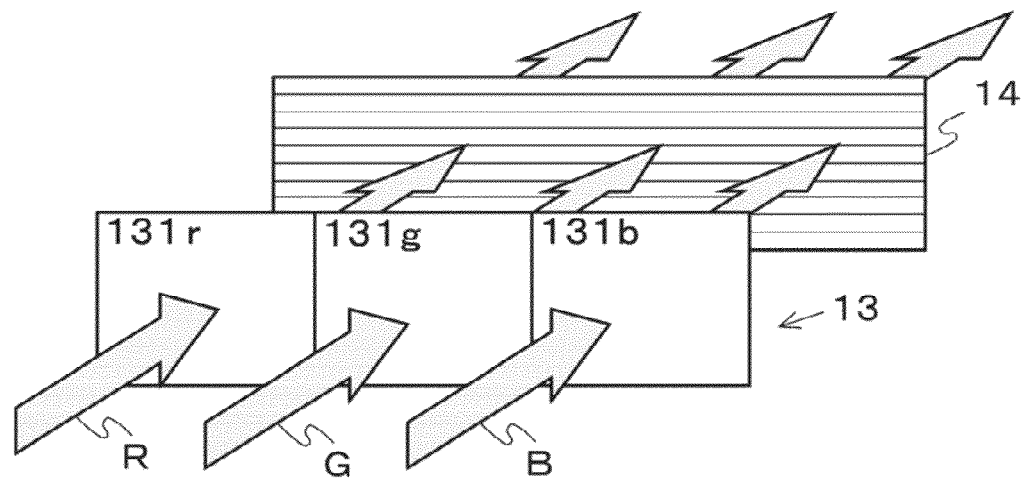

S0 ; MEASURE EXTERNAL ILLUMINANCE P
S1a; HIGH BRIGHTNESS MODE
S1b; LOW BRIGHTNESS MODE

S2 ; CALCULATE TARGET BRIGHTNESS VALUE B1 and F<=1
S3 ; CALCULATE TARGET CURRENT VALUE I1 OR
     TARGET LIGHT SOURCE DUTY RATIO Q1
S4 ; DRIVE LASER LIGHT SOURCE 11 AND
     SCANNING UNIT 20 SCAN
S5 ; MEASURE LIGHT INTENSITY MEASUREMENT VALUE M
S6 ; A1 AND M ARE DIFFERENT ?
S7 ; ADJUST TARGET CURRENT VALUE I1 OR
     TARGET LIGHT SOURCE DUTY RATIO Q1
S8 ; CORRECT WHITE BALANCE
S9 ; REPEAT UNTIL F≦60

Fig.11

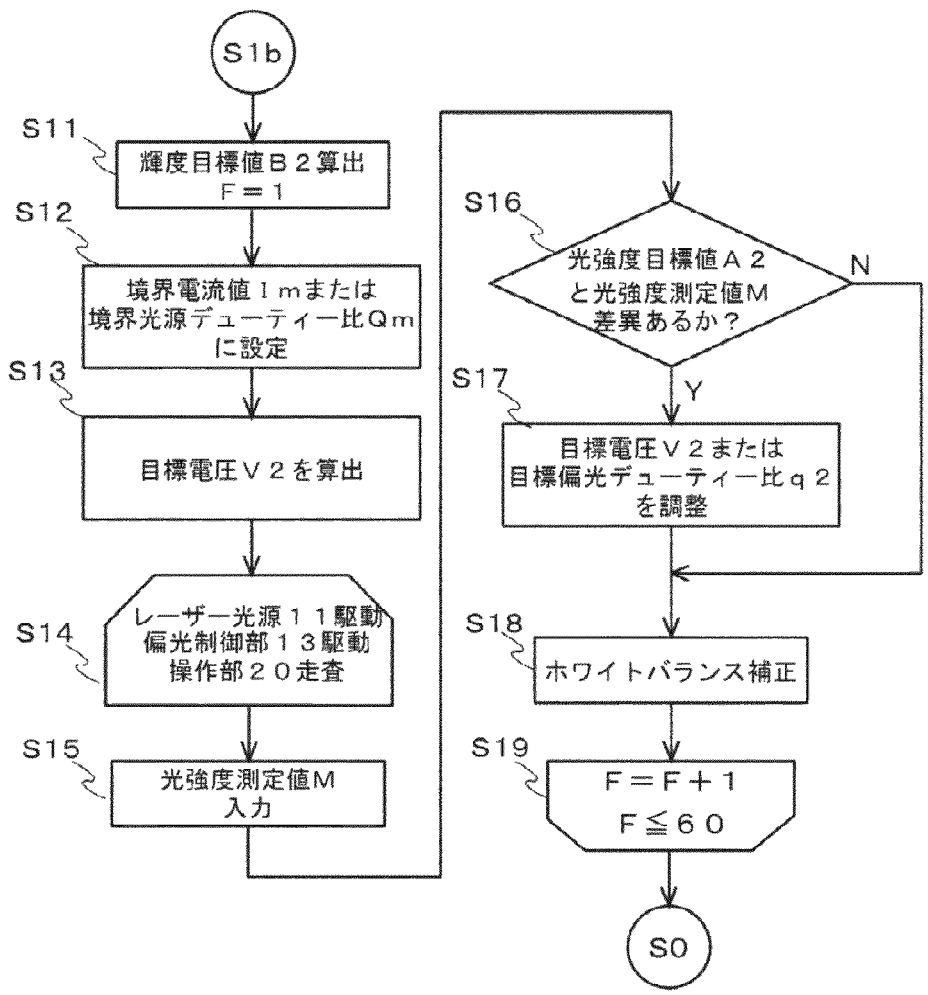

S11; CALCULATE TARGET BRIGHTNESS VALUE B2 AND F<=1
S12; SET CONDITION TO DRIVE LASER LIGHT SOURCE 11 TO BOUNDARY CURRENT VALUE Im OR BOUNDARY LIGHT SOURCE DUTY RATIO Qm
S13; CALCUTATE TARGET VOLTAGE V2
S14; DRIVE LASER LIGHT SOURCE 11 AND SCANNING UNIT 20 AND POLARIZATION CONTROL ELEMENT 13
S15; MEASURE LIGHT INTENSITY MEASUREMENT VALUE M
S16; A2 AND M ARE DIFFERENT ?
S17; ADJUST TARGET VOLTAGE V2 OR TARGET POLARIZATION DUTY RATIO q2
S18; CORRECT WHITE BALANCE
S19; REPEAT UNTIL F≦60

Fig.13
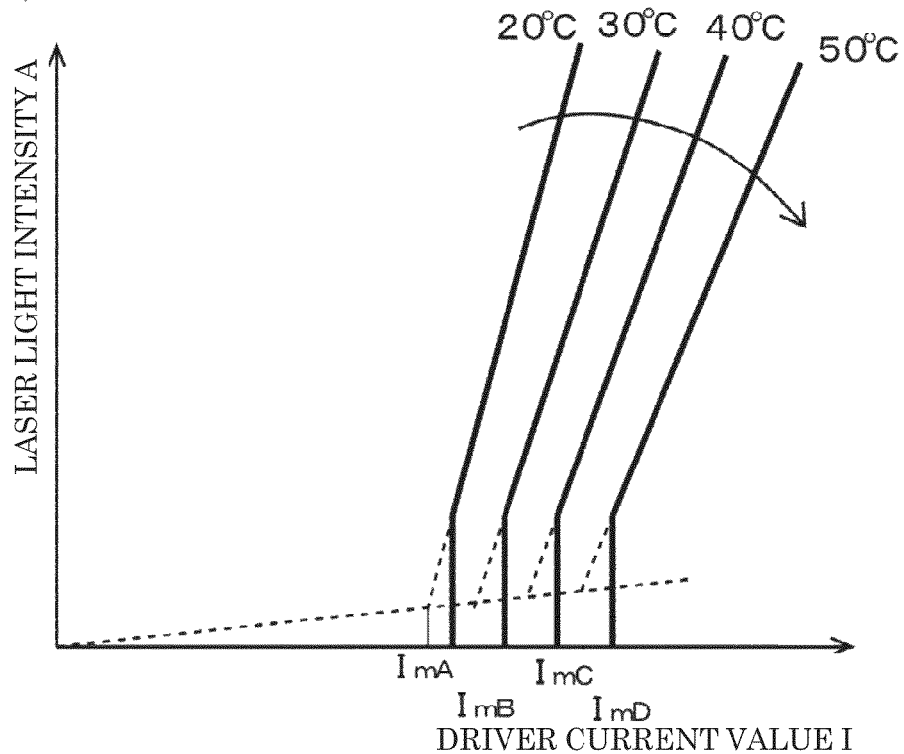
(a)
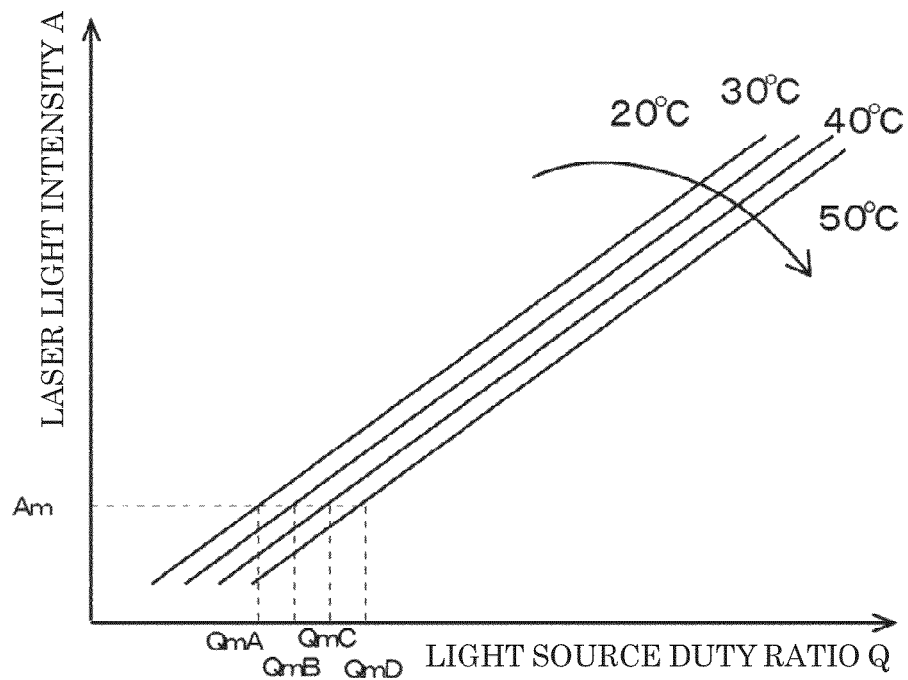
(b)

HEAD-UP DISPLAY DEVICE

TECHNICAL FIELD

The present invention relates to a head-up display (HUD) device, and in particular to a head-up display device for displaying an image by optically scanning light emitted from a laser light source.

BACKGROUND ART

A head-up display device, which displays vehicle information (speed, mileage, etc.) in front of a windshield to enable a vehicle driver to read the information almost without moving eyes during driving, has been proposed in Patent Literature 1, for example.

A head-up display device 1 for a vehicle is installed in a dashboard of a vehicle 2 as shown in FIG. 1. A display light J projected from the head-up display device 1 for a vehicle is reflected by a windshield 3, and a vehicle driver 3 can recognize a virtual image X by superimposing it on scenery.

In such a head-up display device 1 for a vehicle, a semiconductor laser has been proposed as a light source. Such a device is disclosed in Patent Literature 2, for example. Such a head-up display device 1 is provided with a semiconductor laser, a scanning system, and a screen, and is configured to generate a display image by scanning laser light emitted from a semiconductor laser toward a screen by a scanning system.

CITATION LIST

Patent Literature

Patent Literature 1: Japanese Published Unexamined Patent Application Publication No. 5-193400
Patent Literature 2: Japanese Published Unexamined Patent Application Publication No. 7-270711

SUMMARY OF THE INVENTION

Problems to be Solved by the Invention

A head-up display device 1 is required to enable a driver to view a clear display with appropriate brightness even under a bright environment in daytime and dark environment at night. Thus, it is necessary to greatly change the display brightness of a display image to meet the external brightness (external illuminance) of the head-up display device 1.

A display image displayed by the head-up display device 1 requires brightness of several thousands to several tens of thousand $cd/m^2$ or more at a maximum to be viewed under a bright environment in daytime, and requires several $cd/m^2$ at a minimum under a dark environment at night so that glare does not distube driving.

It is necessary to control a laser light intensity to a low level to achieve such a minimum brightness. In particular, for realizing a minimum brightness of several $cd/m^2$ described above, a light intensity is required to be lower than a threshold light intensity value Ath at a threshold current value Ith that is a drive current value to start oscillation of a semiconductor laser as shown in FIG. 4.

However, when a laser light source is controlled at a threshold current value Ith or less, a drive current-laser light intensity characteristics varies around the threshold current value Ith, causing a problem that control is complicated. Further, around the threshold current value Ith, the laser light intensity becomes unstable, affecting a display quality.

In view of the aforementioned problems, an object of the present invention is to provide a head-up display device using a laser light source, which stably realizes a low brightness display not glaring even under a dark environment at night, gives a vehicle driver no discomfort with continuos changes in brightness, and provides an excellent white balance in an entire display brightness range.

Means for Solving the Problem

The present invention has adopted the following means to solve the aforementioned problems.

Namely, in a head-up display device which detects illuminance of external light by an external light intensity detection unit, and adjusts brightness of display based on the external light illuminance, there is provided a display brightness adjustment means which, when a display image is displayed in a low brightness region lower than a predetermined brightness, controls a polarization angle of a polarization control element, and adjusts transmissivity of laser light in a polarization unit, thereby adjusting a display brightness of a display image to a low level.

The present invention has been made in order to solve the aforementioned problems. Accordingly, there is provided in claim 1, a head-up display device comprising:

a laser light source for emitting laser light, and
a laser light control unit for controlling a light intensity of the laser light;
a polarization control element for polarizing the laser light, and
a polarization control unit for optionally controlling a polarization angle of the laser light in the polarization control element;
a polarization unit for passing a specific polarization component;
a scanning unit, which is located on an optical path of laser light emitted from the laser light source, scans an arrived laser light, and projects a desired display image;
a laser light detection unit for detecting the light intensity of the laser light;
an external light detection unit for detecting illuminance of external light; and
a display brightness adjustment means, which calculates a target brightness value to display the display image based on an external illuminance measurement value measured by the external light detection unit, and controls the laser light control unit and the polarization control unit so that the display image is displayed at the target brightness value, wherein
the display brightness adjustment means controls a polarization angle of the polarization control element to a polarization angle that the laser light is not dimmed in the polarization unit, via the polarization control unit, when the external illuminance measurement value is a predetermined boundary external illuminance or higher, and controls a polarization angle of the polarization control element to a polarization angle that the laser light is dimmed in the polarization unit, via the polarization control unit, when the external illuminance measurement value is the boundary external illuminance or lower.

In such a configuration, it is possible to provide a head-up display device, which stably realizes a low brightness display without glaring even under a dark environment at night, and enables a driver to view a clear display with appropriate brightness in a wide range of illumination environments including a dark environment at night and a bright environment in daytime.

In claim 2, there is provided a head-up display device comprising:
a laser light source for emitting laser light, and
a laser light control unit for controlling a light intensity of the laser light;
a polarization control element for polarizing the laser light, and
a polarization control unit for optionally controlling a polarization angle of the laser light in the polarization control element;
a polarization unit for passing a specific polarization component;
a scanning unit, which is located on an optical path of laser light emitted from the laser light source, scans an arrived laser light, and projects a desired display image;
a laser light detection unit for detecting the light intensity of the laser light;
an external light detection unit for detecting illuminance of external light; and
a display brightness adjustment means, which calculates a target brightness value to display the display image based on an external illuminance measurement value measured by the external light detection unit, and controls the laser light control unit and the polarization control unit so that the display image is displayed at the target brightness value, wherein
the display brightness adjustment means comprises;
a high brightness control mode that adjusts the display image brightness to the target brightness value by controlling a laser light intensity of the laser light source, via the laser light control, when the external illuminance measurement value is a predetermined boundary external illuminance or higher; and
a low brightness control mode that adjusts the display image brightness to the target brightness value by controlling a laser light intensity of the laser light source, via the laser light control unit, when the external illuminance measurement value is the boundary external illuminance or lower.

In such a configuration, it is possible to provide a head-up display device, which stably realizes a low brightness display without glaring even under a dark environment at night, and enables a driver to view a clear display with appropriate brightness in a wide range of illumination environments including a dark environment at night and a bright environment in daytime.

Further, in claim 3, an image quality correction means for correcting a white balance of the display image is further provided. In such a configuration, it is possible to provide a head-up display device with an excellent white balance.

In claim 4, the image quality correction means corrects a white balance of the display image by controlling a light intensity of the laser light source via the laser light control unit. In such a configuration, it is possible to provide a head-up display device with an excellent white balance.

In claim 5, the image quality correction means corrects a white balance of the display image by controlling a polarization angle of the polarization control element via the polarization control unit. In such a configuration, it is possible to provide a head-up display device with an excellent white balance.

In claim 6, a drive current value of the laser light source is set to a value greater than a threshold current value of the laser light source. In such a configuration, a laser light source is driven at a threshold current value to oscillate laser or higher in all regions including a low brightness region and a high brightness region, and it is possible to easily and stably control a light output.

In claim 7, the laser light control unit controls the laser light source by PAM driving or PWM driving, so that a light intensity gradually becomes a desired level.

In claim 8, the polarization control unit gradually changes a level of applied voltage of the polarization control element. According to claim 7 or claim 8, it is possible to provide a head-up display device which does not give a vehicle driver discomfort with continuous changes in brightness of a display image when a display brightness is adjusted to a desired level to meet an external illuminance measurement value.

In claim 9, the laser light source comprises a plurality of laser light sources with different wavelengths. In such a configuration, it is possible to display a color image by using a plurality of laser light sources with difference wavelengths.

In claim 10, the polarization control element comprises a plurality of independently controllable polarization regions. In such a configuration, it is possible to adjust a white balance to a desired level by controlling a polarization angle of a polarization control element for each laser light source and by adjusting a transmissivity of a polarization unit, in consideration of different wavelengths of RGB, and a polarization degree and a visible light transmissivity of a laser light source depending on individual differences.

In claim 11, the polarization control element and the polarization unit are provided for each of the laser sources. In such a configuration, with respect to the invention of claim 8, it is possible to adjust more reliably a laser light intensity and a white balance for each laser light.

In claim 12, the polarization control element and the polarization unit are provided on an optical path of a synthetic laser light obtained by synthesizing laser light emitted from the plurality of laser light sources with different wavelengths. In such a configuration, it is possible to provide a head-up display device, in which a polarization control element and a polarization unit can be shared by a plurality of laser light sources, thereby reducing costs to lower than the devices of claims 10 and 11.

In claim 13, the synthetic laser light is obtained by emitting laser light sources with different wavelengths for each sub-frame obtained by timely dividing a frame, and the polarization control unit controls a polarization angle of the polarization control element for the each sub-frame. In such a configuration, it is possible to provide a head-up display device with an excellent white balance by sharing a polarization control element and a polarization unit among a plurality of laser light sources, thereby reducing costs, and by controlling a polarization angle of a polarization control element for each laser light source, and by adjusting a transmissivity of a polarization unit, in consideration of different wavelengths of RGB, and a polarization degree and a visible light transmissivity of a laser light source depending on individual differences.

Effect of the Invention

According to the present invention, there is provided with a head-up display device using a laser light source, which stably realizes a low brightness display without glaring even under a dark environment at night, does not give a vehicle driver discomfort with continuous changes in brightness, and has an excellent white balance in an entire display brightness region.

BRIEF DESCRIPTION OF THE DRAWINGS

FIG. 5 shows diagrams explaining polarization in a polarization control element, (a) showing a case where RGB laser light is not passed, and (b) showing a case where RGB laser light is passed.

FIG. 11 is a flowchart of adjusting a display brightness and a white balance of a display image in a low brightness mode according to the invention.

FIG. 13 shows graphs showing temperature characteristics of a laser light source according to the invention, (a) showing drive current-laser light intensity temperature characteristics, and (b) showing light source duty ratio-laser light intensity temperature characteristics.

MODES FOR CARRYING OUT THE INVENTION

Hereinafter, an embodiment of applying the present invention to a head-up display device will be described with reference to the accompanying drawings.

(Structure of HUD Device)

A head-up display device (a HUD device) 1 according to an embodiment of the invention will be explained with reference to the accompanying drawings.

Figure 1:
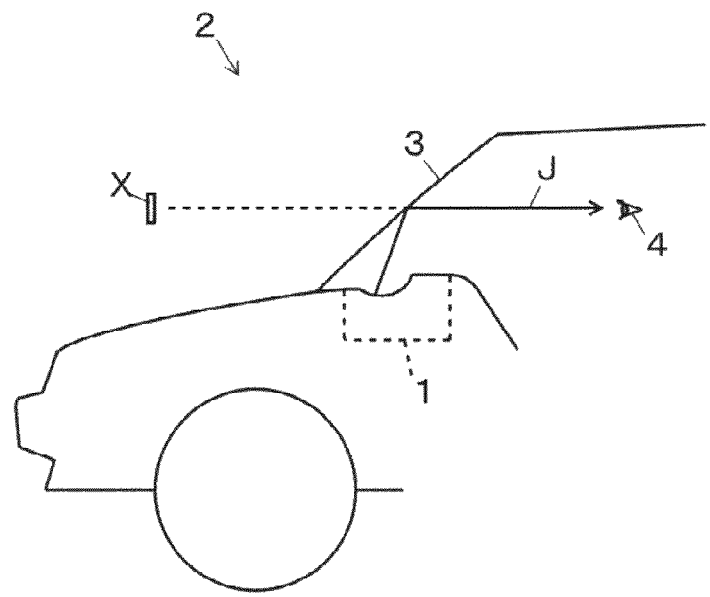
FIG. 1 is an overview of a head-up display device.

The HUD device 1 according to the embodiment is installed in a dashboard of a vehicle 2 as shown in FIG. 1, and is configured to enable a vehicle driver 4 to recognize a virtual image X of a display image D indicating vehicle information by reflecting a display light J indicating a generated display image D (see FIG. 2 and FIG. 6) on a windshield 3. Thus, the vehicle driver 4 can visually recognize the vehicle information without removing eyes from the front during driving.

Figure 2:
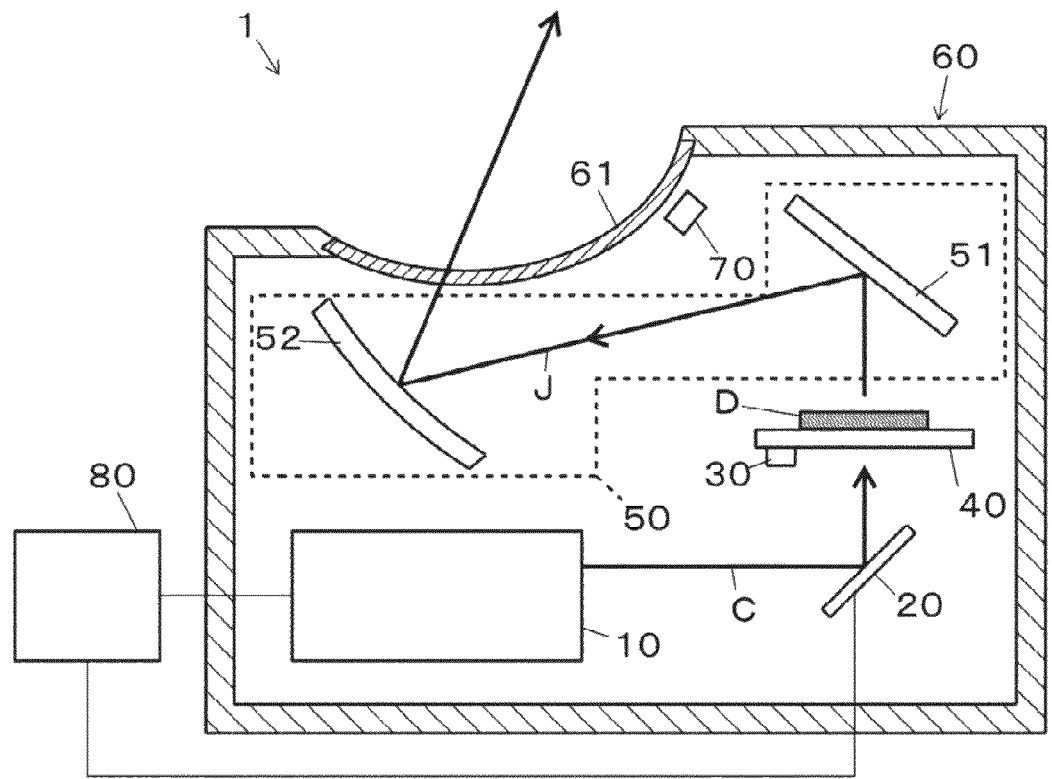
FIG. 2 is a diagram showing a configuration of a head-up display (HUD) device according to the present invention.

FIG. 2 is a diagram showing a configuration of the HUD device 1. The HUD device 1 comprises a synthetic laser light generation unit 10, a MEMS scanner 20, a color sensor 30, a transmissive screen 40, a reflection unit 50, a housing 60, a light sensor 70, a control unit 80 for electrically controlling the HUD device 1.

Figure 3:
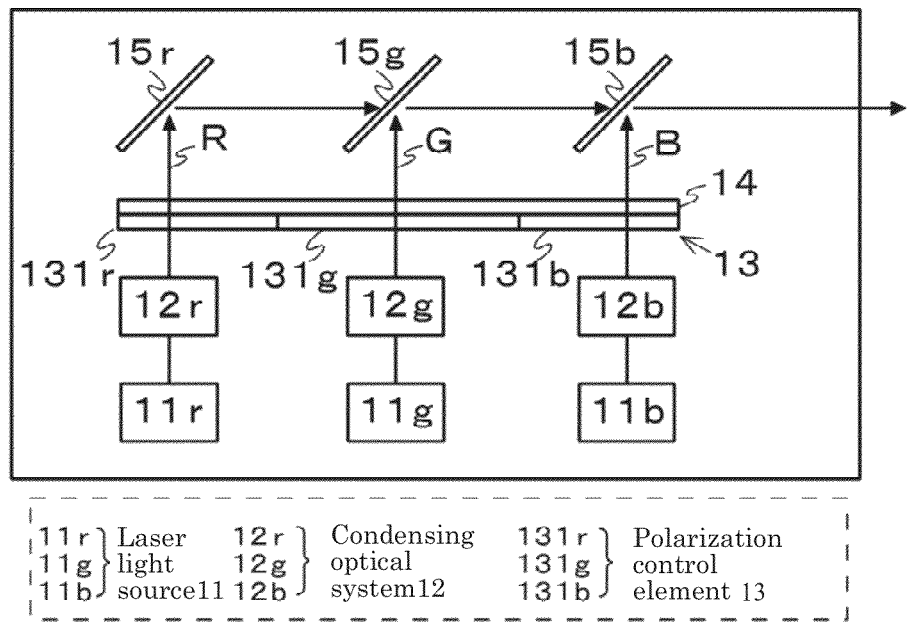
FIG. 3 is a block diagram of a synthetic laser generation unit.

The synthetic laser light generation unit 10 is a unit configured to combine laser light of three primary colors of RGB into single synthetic laser light, and to emit a synthetic laser light C. As shown in FIG. 3, the synthetic laser light generation unit 10 comprises a laser diode (a laser light source) 11, a condensing optical system 12, a liquid crystal panel (a polarization control element) 13, a polarization plate (a polarization unit) 14, and a dichroic mirror 15.

The laser diode 11 is a semiconductor laser, and is composed of a laser diode 11r for emitting a red laser light R, a green laser diode 11g for emitting a green laser light G, and a blue laser diode 11b for emitting a blue laser light B.

Figure 4:
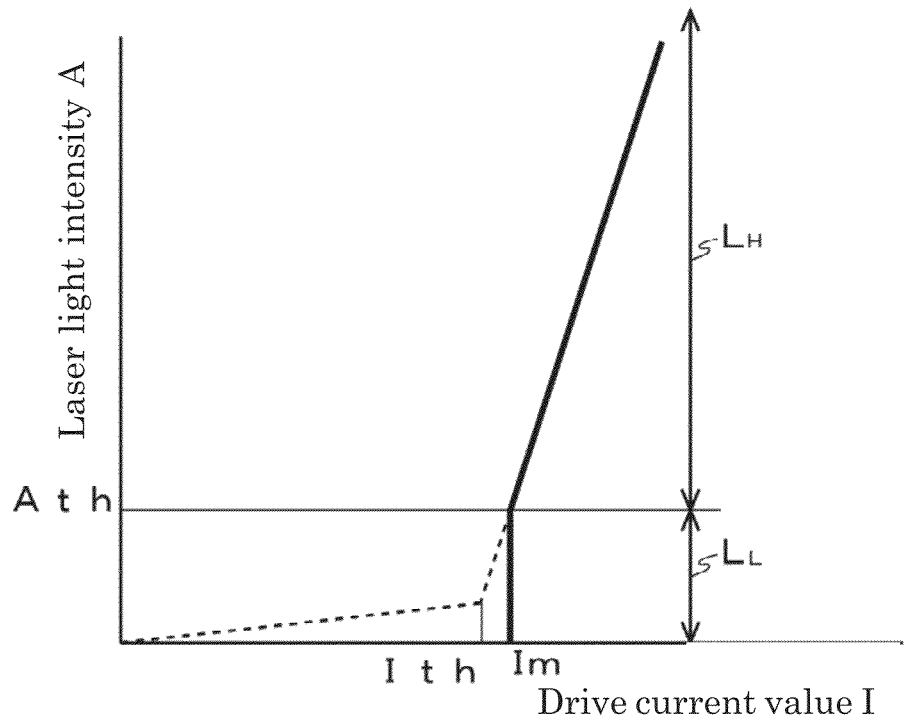
FIG. 4 is a graph showing drive current-laser light intensity characteristics of a laser light source.

Generally, as shown in FIG. 4, current-light intensity characteristics of a semiconductor laser are different in a region of a threshold current value Ith or greater and a region of a threshold current value Ith or less. In a region of a threshold current value Ith or greater, laser light by induced emission is oscillated, but in a region of a threshold current value Ith or less, non-laser light by spontaneous emission is emitted.

As the current-light intensity characteristics are different in regions greater or less than the threshold current value Ith, there arise a problem that a control method becomes complex when controlling a laser light intensity A across the threshold current value Ith.

The laser diodes 11r, 11g and 11b emit RGB laser light, respectively, to the condensing optical system 12 based on drive data from a laser light control unit 82 to be described later.

The condensing optical system 12 comprises condensing lenses 12r, 12g and 12b corresponding to the laser diodes 11r, 11g and 11b, respectively.

The condensing lens 12r is disposed on an optical path of a laser light R emitted from the laser diode 11r, and converges the laser light R. This also applies to the relationship between the condensing lens 12g and the green laser diode 11g, and between the condensing lens 12b and the blue laser diode 11b.

The liquid crystal panel (polarization control element) 13 optionally varies polarization angles of the RGB laser light by controlling an applied voltage based on control data from a polarization control unit 83 to be described later.

The liquid crystal panel 13 comprises liquid crystal cells (polarization controllable regions) 131r, 131g and 131b corresponding to the RGB laser light of each wavelength. The liquid crystal cells 131r, 131g and 131b can be independently controlled.

In such a configuration, it is possible to control a polarization angle of the polarization control element 13 for each laser diode 11 in consideration of the different wavelengths of RGB and the polarization degree of the polarization control element 13 and visible light transmissivity of the laser diode 11 depending on individual differences.

Further, in the embodiment, the control liquid crystal panel 13 uses a twisted nematic (TN) liquid crystal, for examples. Hereinafter, the liquid crystal panel 13 will be assumed to be a TN liquid crystal.

The polarization plate (polarization unit) 14 is disposed on an optical path behind the liquid crystal panel 13 that passes the RGB laser light, and is configured to transmit only light with a specific polarization angle, and to reflect or absorb the others. The direction of a transmission axis of the polarization plate 14 is determined in considering of polarization dependency of the reflectivity of the windshield 3. In the embodiment, although the polarization plate 14 is disposed so as to closely contact the liquid crystal panel 13, it may be disposed not to closely contact the liquid crystal panel.

Hereinafter, using in FIG. 5, an explanation will be given to polarization of RGB laser light by the liquid crystal panel (polarization control element) 13 and the polarization plate (polarization unit) 14.

FIG. 5 shows diagrams showing a case (a) where RGB laser light is not passed through the liquid crystal panel 13 and polarization plate 14, and a case (b) where RGB laser light is passed through the liquid crystal panel 13 and polarization plate 14.

(When the Laser Light is not Passed)

As shown in FIG. 6(a), the RGB laser light exits the liquid crystal cells 131r, 131g and 131b, respectively, while keeping the same polarization angles as those when entering the liquid crystal cells 131r, 131g and 131b.

The exited RGB laser light enters the polarization plate 14, but can not pass through the polarization plate 14, because the polarization angle of the RGB laser light is orthogonal to the transmission axis of the polarization plate 14 at this time. In other words, the light intensity of the RGB laser light is extremely lowered by combination of the liquid crystal panel 13 and polarization plate 14.

The polarization angle of the RGB laser light does not change after passing through the liquid crystal panel 13 as described above only in a case where the liquid crystal panel 13 is applied with a voltage, and the liquid crystal molecules are completely raised.

(When the Laser Light is Passed)

On the other hand, as shown in FIG. 6(b), the RGB laser light exits the liquid crystal cells 131r, 131g and 131b, respectively, at a polarization angle rotated by 90° with respect to when entering the liquid crystal cells 131r, 131g and 131b.

The exited RGB laser light enters the polarization plate 14, and exits the polarization plate 14 without being dimmed, because the polarization angle of the RGB laser light coincides with the transmission axis of the polarization plate 14 at this time.

As described above, the polarization angle of the RGB laser light passed through the liquid crystal panel 13 is rotated by 90° only in a case where the liquid crystal panel 13 is not applied with a voltage, or applied with a low voltage that does not change arrangement of the liquid crystal molecules.

Figure 6:
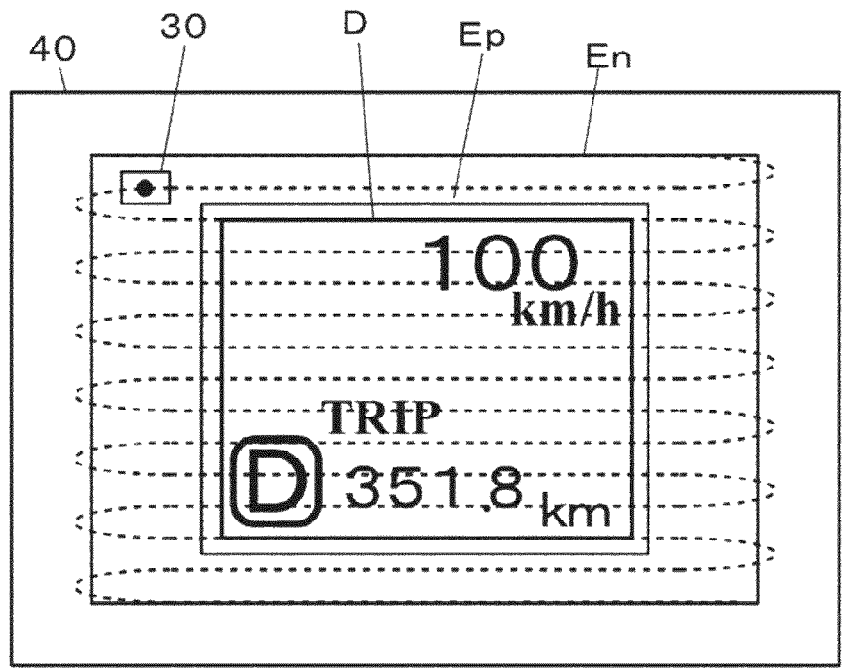
FIG. 6 is a diagram explaining a display image projected from a scanning unit.

In FIG. 6, although the polarization angles by the liquid crystal cells 131r, 131g and 131b are the same, the polarization angles of the liquid crystal cells 131r, 131g and 131b can be independently controlled.

The above example is applied to the case that the laser light exited from the liquid crystal panel 13 is completely passed through or blocked, but this is not the case in practice.

By controlling the applied voltage V to the liquid crystal panel 13, the laser light polarization angle can be controlled in a range of 0 to 90°, and thereby controlling a laser light transmissivity Z in the polarization unit 14. Thus, a laser light intensity A exiting from the polarization plane 14 can be optionally determined. (FIG. 10 (f) shows a transition of the transmissivity Z in the polarization unit 14 when the applied voltage V is controlled.)

Further, in the embodiment, a normally white liquid crystal has been assumed, that is, laser light is passed when the liquid crystal panel 13 is used with the applied voltage V turned off, and laser light is blocked when the liquid crystal panel 13 is used with the applied voltage V turned on. However, a normally black liquid crystal may be used.

Referring again to FIG. 3, the dichroic mirror 15 is composed of a mirror with a thin film such as a dielectric multi-player film formed on a mirror surface, and is comprised of dichroic mirrors 15r, 15g and 15b arranged on each optical path of RGB laser light. The dichroic mirror 15 reflects or passes the RGB laser light emitted from the laser diodes 11r, 11g and 11b, respectively, and synthesizes the RGB laser light into single laser light.

More specifically, the dichroic mirror 15r is located in a traveling direction of the laser light R from the condensing lens 12r, and is arranged at a predetermined angle with respect to the light traveling direction. Thus, the dichroic mirror 15r reflects the laser light R.

The dichroic mirror 15g is located in a traveling direction of the light from the condensing lens 12g and dichroic mirror 15r, and is arranged at a predetermined angle with respect to the traveling directions of each light, thereby passing the laser light R, and reflecting the laser light G. In other words, the dichroic mirror 15g synthesizes the laser light R and G.

The dichroic mirror 15b is located in a traveling direction of the light from the condensing lens 12b and dichroic mirror 15g, and is arranged at a predetermined angle with respect to the traveling directions of each light, thereby passing the synthesized laser light R and G, and reflecting the laser light B. In other words, the dichroic mirror 15b further synthesizes the laser light R and B.

As described above, the RGB laser light is synthesized into single synthetic laser light C. As each of the laser diodes 11r, 11g and 11b is arranged in being adjusted, the polarization angle of each of the combined RGB laser light is identical, and is determined in consideration of polarization dependency of the reflectivity of the windshield 3. The combined synthetic laser light C exits the synthetic laser light generation unit 10, and travels to the MEMS scanner 20.

FIG. 6 shows a screen 40 viewed from the MEMS scanner 20. The MEMS (micro electromechanical system) scanner 20 scans a synthetic laser light C emitted from the synthetic laser light generation unit 10, and generates a display image D on a transmissive screen 40.

The display image D drawn by the MEMS scanner 20 is generally smaller than a scanning possible range En. Especially, in a horizontal direction, a reflection plane is oscillated by resonance, and an operation speed of the reflection plane slows down, or a reflection plane completely stops in an area near a point of switching back and forth of scanning, causing distortion in the display image D or decreasing the resolution. Thus, an area near a point of switching back and forth of scanning is not used as a display area Ep.

The color sensor 30 detects a laser light intensity A of each of RGB laser light, and outputs analog data of the laser light intensity A to a microcomputer 81. The color sensor 30 is disposed in a scanning possible area En under the transmissive screen 40 and in a non-display area out of the display area Ep, thereby enabling detection of the laser light intensity A of RGB laser light without affecting the display image D.

Although the color sensor 30 is disposed on a lower surface of the transmissive screen 40 in the embodiment, the position is optional.

The transmissive screen 40 is composed of a diffusion plate, a holographic diffuser, a microlens array, etc., and is configured to receive the RGB laser light scanned by the MEMS scanner 20 on a lower surface, and to display the display image D on an upper surface.

The reflection unit 50 is an optical system, which is provided between the optical paths of the transmissive screen 40 and windshield 3, so that the display image D displayed on the upper surface of the transmissive screen 40 is formed as a virtual image X at a desired position in a desired size.

In the embodiment, the reflection unit 50 comprises two mirrors of a plane mirror 51 and a magnifying mirror 52, but the configuration is optional.

The plane mirror 51 is a planar total reflection mirror or the like, which is disposed at a position to receive a display light J passing through the transmissive screen 40, and reflects the display light J to the magnifying mirror 52.

The magnifying mirror 52 is a concave mirror or the like, which reflects a display light J reflected by the plane mirror 51, and emits the display light J to the windshield 3. Thus, a size of a virtual image X to be formed becomes that of a magnified display image D.

The housing 60 is formed in a box shape from a hard resin or the like, provided with a window part 61 of a predetermined size in an upper part, and houses the components 10 to 50 described above in predetermined positions.

The window part 61 is formed in a curved shape from a transparent resin such as acrylic, and is attached to an opening of the housing 60 by welding or the like. The window part 61 passes the light reflected by the magnifying mirror 52. The window part 61 has a light sensor 70 to be described later on a lower surface.

In the embodiment, the light sensor 70 is placed on a lower surface of the window part 61, but the position is optional as long as an external illuminance measured value falls in a detectable range higher than a predetermined value.

Next, a control system of the HUD device 1 will be explained with reference to FIG. 7.

(Control System of HUD Device)

Figure 7:
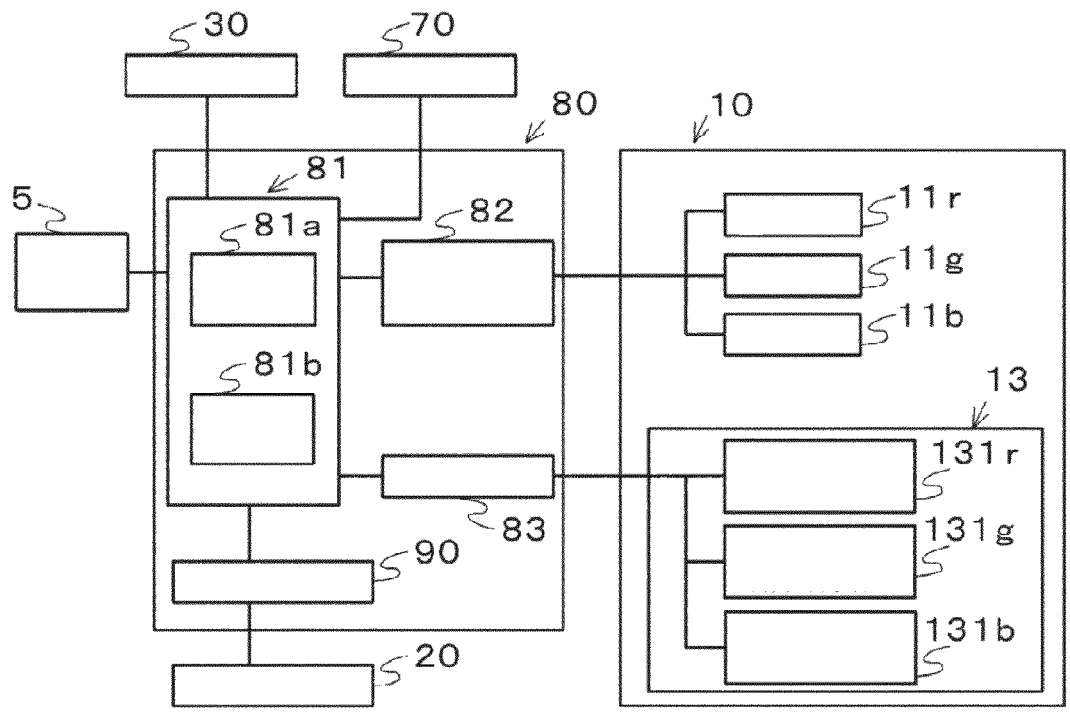
FIG. 7 is a block diagram of a control system according to the present invention.

FIG. 7 is a block diagram of a head-up display device according to the present invention.

A control system of a HUD device 1 according to the invention comprises a synthetic laser light generation unit 10, a MEMS scanner 20, a color sensor 30, a light sensor 70, and a control unit 80.

The color sensor 30 detects a laser light intensity A of each of RGB laser light, and outputs a light intensity measurement value M as analog data of the laser light intensity A to the control unit 80.

The light sensor 70 detects an external illuminance P of the HUD device 1, and outputs an external illuminance measurement value P1 as analog data of the illuminance to the control unit 80.

The control unit 80 comprises a microcomputer 81, a laser light control unit 82, a polarization control unit 83, and a MEMS driver 90.

The microcomputer 81 is supplied with image data for displaying a display image D from a vehicle ECUS by low voltage differential signal (LVDS) communication or the like, controls the laser diode 11 according to the image data via the laser light control unit 82, and projects a desired display image D onto the transmissive screen 40 by controlling the MEMS scanner 20 via the MEMS driver 90.

Further, the microcomputer 81 identifies a scanning position of a synthetic laser light C from a synchronization signal of the MEMS scanner 20, stores position information of the previously installed color sensor 30, and drives the laser diodes 11r, 11g and 11b via the laser light control unit 82 at the timing of overlapping the scanning position and the position of the color sensor 30.

Further, the microcomputer 81 comprises a display brightness adjustment means 81a for adjusting a display brightness B of a display image D, and an image quality correction means 81b for adjusting a white balance of a display image D.

The display brightness adjustment means 81a calculates a target brightness value B1 that is an appropriate brightness of a display image from an external illuminance measurement value P1 outputted from the light sensor 70, and controls a laser light intensity A of the laser diode 11 via the laser light control unit 82 based on the calculation result, or adjusts a polarization angle of the liquid crystal panel 13 via the polarization control unit 83 based on the calculated target brightness value B1, and adjusts a display brightness B of an display image D by controlling a transmissivity Z of the polarization plate 14.

The image quality correction means 81b adjusts a laser light intensity A of each of the laser diodes 11r, 11g and 11b based on each of the light intensity measurement values Mr, Mg and Mb of the RGB laser light outputted from the color sensor 30 to obtain a desired white balance.

Otherwise, the image correction unit 81b adjusts a polarization angle of each of the liquid crystal cells 131r, 131g and 131b, and controls a transmissivity Z of the polarization plate 14, thereby correcting a white balance of the display image D.

The laser light control unit 82 drives the laser diode 11 based on laser light source control data from the microcomputer 81.

The polarization control unit 83 drives the liquid crystal panel 13 based on polarization control data from the microcomputer 81.

Next, an explanation will be given to a method of adjusting a display brightness B by the display brightness adjustment means 81a in a case where a display image D to be displayed the HUD device 1 is displayed in a high brightness region LH, and in a case where it is displayed in a low brightness region LL, with reference to FIG. 8 to FIG. 11.

Figure 8:
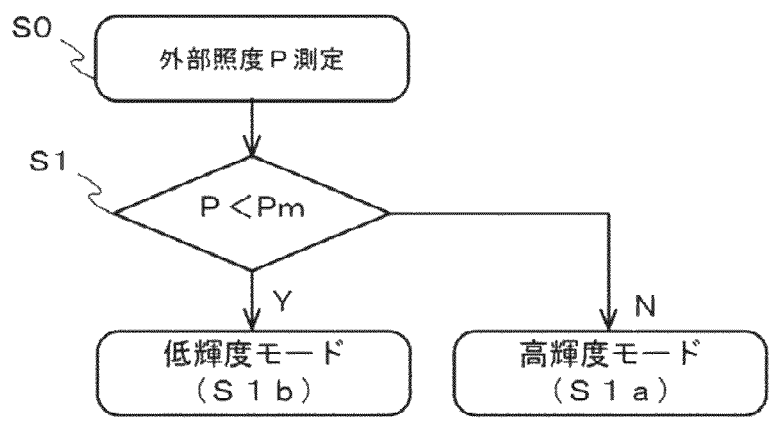
FIG. 8 is a flowchart of switching a low brightness mode and a high brightness mode in a control unit according to the invention.

First, as shown in FIG. 8, in step S0, the light sensor 70 measures an external illuminance P that is illuminance outside the HUD device 1, and outputs the measurement data to the microcomputer 81.

In step S1, the display brightness adjustment means 81a shifts to a high brightness mode S1(S1a) when the external illuminance P detected by the light sensor 70 is higher than a predetermined boundary external illuminance Pm, and shifts to a low brightness mode (S1b) when it is lower than the boundary external illuminance Pm.

The boundary external illuminance Pm is a value calculated from a predetermined boundary current value Im, and is a value higher than a threshold external illuminance value Pth that is calculated based on a threshold current value Ith at which one of the laser diode 11r, green laser diode 11g, and blue laser diode 11b does not oscillate.

(High Brightness Region)

Figure 9:
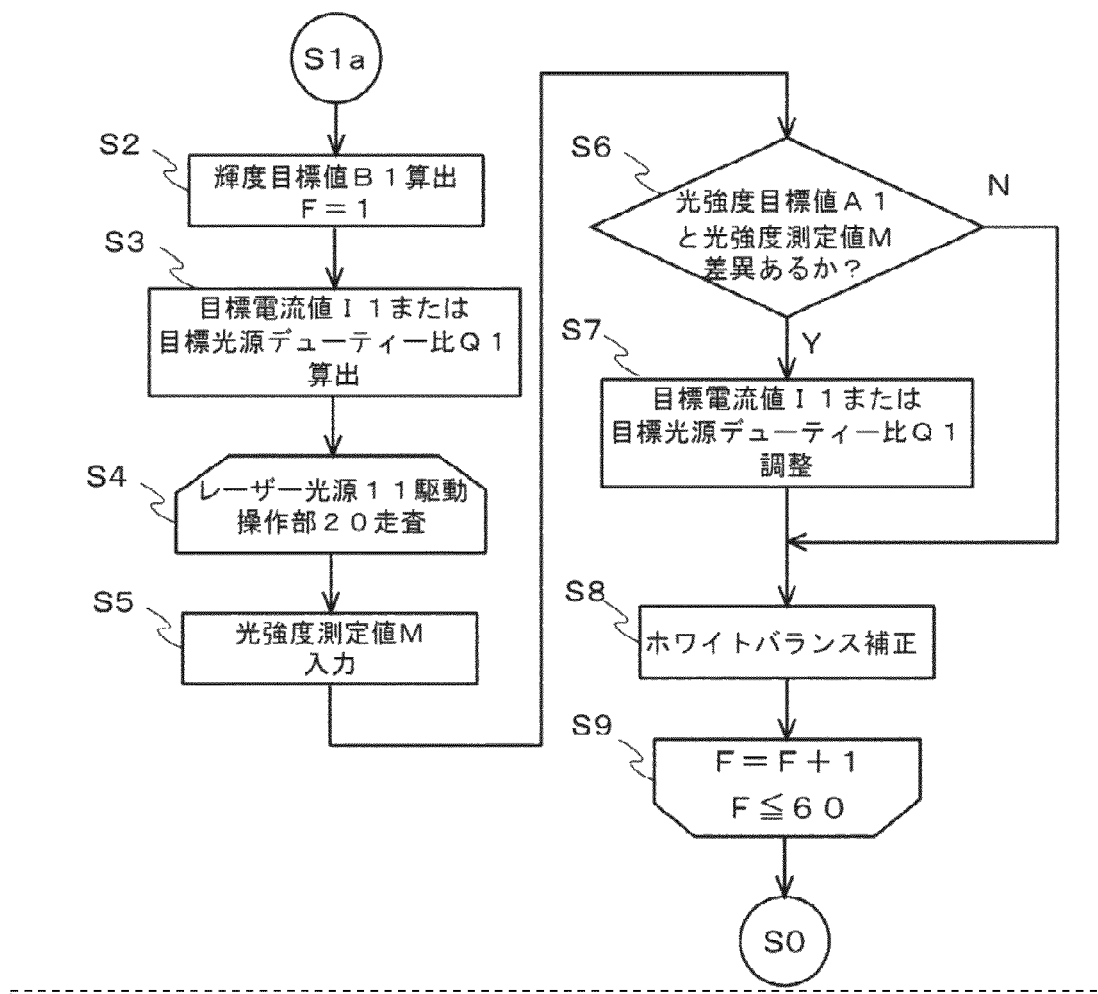
FIG. 9 is a flowchart of adjusting a display brightness and a white balance in a high brightness mode according to the invention.

A high brightness mode S1a is performed along the flowchart of FIG. 9. In the following explanation, measurement data of external illuminance P is assumed to be an external illuminance measurement value P1.

Figure 10:
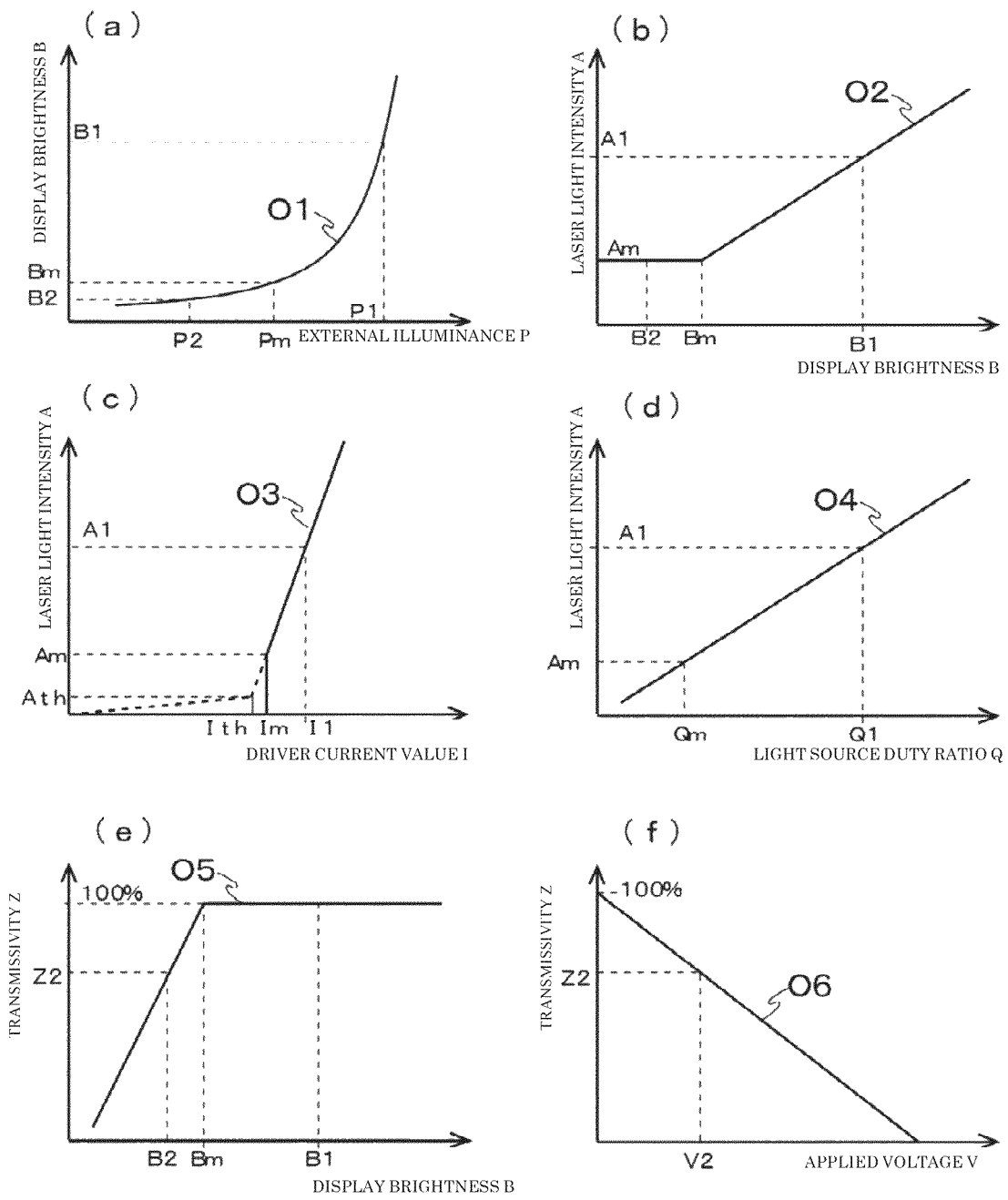
FIG. 10 shows examples of characteristics tables for calculating a target current value, a target light source duty ratio, and a target voltage from an external illuminance P according to the invention, (a) showing an example of external illuminance-display brightness data table O1, (b) showing an example of display brightness-laser light intensity data table O 2, (c) showing an example of drive current-laser light intensity data table O 3, (d) showing an example of light source duty ratio-laser light intensity data table O 4, (e) showing an example of display brightness-transmissivity data table O 5, and (f) showing an example of applied voltage-transmissivity data table O 6.

In step S2, as shown in FIG. 10 (a), the display brightness adjustment means 81a calculates a target brightness value B1 that is brightness of a display image suitable for an external illuminance measurement value P1, based on the example of external illuminance-display brightness data table O1 stored in the microcomputer 81. Next, as shown in FIG. 10 (b), the display brightness adjustment means 81a calculates a target brightness value A1 of the laser light source 11 corresponding to the target brightness value B1, based on the display brightness-laser light intensity data table O 2.

In step S3, the display brightness adjustment means 81a calculates (1) a target current value I1 of the laser light source 11 corresponding to the target light intensity value A1, based on the drive current-laser light intensity characteristics data table O 3 (FIG. 10 (c)) stored in the microcomputer 81. Or, the display brightness adjustment means 81a calculates (2) a target light source duty ratio Q1 of the laser light source 11 corresponding to the target light intensity value A1 calculated above, based on the light source duty ratio-laser light intensity characteristics data table O 4 (FIG. 10 (d)) stored in the microcomputer 81.

In step S4, the display brightness adjustment means 81a controls (1) each of the laser light sources 11r, 11g and 11b by pulse amplitude modulation (PAM) based on the target current value I1 calculated as above. Or, the display brightness adjustment means 81a controls (2) by pulse width modulation (PWM) based on the target light source duty ration Z1 calculated as above.

The RGB laser light of each of the laser light sources 11r, 11g and 11b is synthesized. The synthetic laser light C is emitted from the synthetic laser light generation unit 10, and scanned by the scanning unit 20, and projected onto the screen 40.

In step S5, the color sensor 30 measures a light intensity measurement value M that is a light intensity of each of the RGB laser light. The light intensity measurement value M is output to the microcomputer 81 as analog data.

In step S6, the display brightness adjustment means 81a compares the target light intensity value A1 calculated based on the external illuminance measurement value P1 and the light intensity measurement value M that is an actually measured light intensity of the synthetic laser light C calculated by the color sensor 30.

In step S7, when the target light intensity value A1 and the light intensity measurement value M are different according to the result of the comparison in step S6, the display brightness adjustment means adjusts the target current value I1 or target light source duty ratio Q1 of the laser light source 11 so that the light intensity measurement value M substantially coincides with the target light intensity value A1.

In step S8, an image quality correction means 84 corrects a white balance by adjusting the laser light intensity A of each of the laser diodes 11r, 11g and 11b based on the light intensity measurement value M of each of the RGB laser light, so as to obtain a desired white balance of a display image D.

In step S9, feedback control (steps S4 to S9) is repeated so that the light intensity measurement value M becomes close to the target light intensity value A1.

The above control method will be explained in detail assuming that a frame rate of the display image D is 60 fps (60 frames are processed per second).

In a first frame, the display brightness adjustment means 81a calculates a target current value I1 or a target light source duty ratio Q1 so as to obtain the target light intensity value A1 that is calculated from the external illuminance measurement value P1 measured by the light sensor 70 (steps S0, S2 and S3).

The display brightness adjustment means 81a drives the laser light source 11 at the target current value I1 or the target light source duty ratio Q1, and controls feedback to adjust the target current value I1 or the target light source duty ratio Q1 while considering a white balance, so that the light intensity measurement value M measured by the color sensor 30 substantially coincides with the target light intensity value A1 (step S4 to S8).

In a second frame, the display brightness adjustment means 81a drives the laser light source 11 at the target current value I1 or the target light source duty ratio Q1 adjusted in the first frame, scans the scanning unit 20, projects a display image D of the second frame, and controls feedback to adjust again the target current value I1 or the target light source duty ratio Q1 of the laser light source 11, so that the light intensity measurement value M measured by the color sensor 30 substantially coincides with the target light intensity value A1 (step S4 to S8).

Up to a 60th frame, as in the second frame, the display brightness adjustment means 81a repeats feedback control to adjust the target current value I1 or the target light source duty ratio Q1 of the laser light source 11, so that the light intensity measurement value M measured by the color sensor 30 substantially coincides with the target light intensity value A1 (step S4 to S8).

In a 61st frame, as in the first frame, the display brightness adjustment means 81a calculates again a target light intensity value A1 based on the external illuminance measurement value P1 measured by the light sensor 70, and calculates a target current value I1 or a target light source duty ratio Q1 corresponding to the calculated target light intensity value A1.

Thereafter, the feedback control is repeated as in steps S4 to S8.

It is also possible to perform the feedback control (steps S4 to S8) for only the first to fifth frames, for example, not to perform for each frame as in the above embodiment. In this case, for the 6th to 60th frames, the laser diode 11r, green laser diode 11g and blue diode 11b are continuously driven at a target current value I1 that reflects the result of the feedback for the fifth frame. In such a configuration, it is possible to simplify the control without frequently performing the feedback control.

The aforementioned control method is an embodiment of the invention, and it is possible to optionally determine the timing of reading the external illuminance P and the number of feedback controls.

(Low Brightness Region)

A low brightness mode S1b is performed along the flowchart of FIG. 11. In the following explanation, measurement data of external illuminance P is assumed to be an external illuminance measurement value P2.

In step S11, as shown in FIG. 10 (a), the display brightness adjustment means 81a calculates a target brightness value B2 that is brightness of a display image suitable for an external illuminance measurement value P2, based on the external illuminance-display brightness table O 1 stored in the microcomputer 81, and as shown in FIG. 10 (b), calculates a target brightness value A2 of the laser light source 11 corresponding to the target brightness value B2 based on the display brightness-laser light intensity data table O2.

In step S12, the display brightness adjustment means 81a sets a condition to drive the laser light source 11 to a predetermined boundary current value Im or a boundary light source duty ratio Qm.

In step S13, the display brightness adjustment means 81a calculates a target transmissivity Z2 of the RGB laser light in the polarization plate 14 corresponding to the target light intensity value A2 calculated above, based on the previously stored display brightness-transmissivity characteristics table O 4 of FIG. 10 (e), and calculates a target voltage V2 of each of the polarization controllable regions 131r, 131g and 131b corresponding to the target transmissivity Z2 calculated above, based on the applied voltage-transmissivity characteristics data table O 6 (FIG. 10 (f)).

In step S14, the display brightness adjustment means 81a drives the laser light source 11 at the above boundary current value Im or the boundary light source duty ratio Qm. The polarization controllable regions 131r, 131g and 131b are driven at the above target voltage V2 to polarize the RGB laser light at a desired polarization angle. The polarized RGB laser light is dimmed to the desired target light intensity value A2 by the polarization plate 14. The dimmed RGB laser light is synthesized. A synthetic laser light C is output from the synthetic laser light generation unit 10, and scanned by the scanning unit 20, and projected onto the screen 40.

In step S15, the color sensor 30 measures a light intensity measurement value M that is a light intensity of each of the RGB laser light. The light intensity measurement value M is output to the microcomputer 81 as analog data.

In step S16, the display brightness adjustment means 81a compares the target light intensity value A2 calculated based on the external illuminance measurement value P2 and the light intensity measurement value M that is an actual measurement value of the light intensity of the synthetic laser light C.

In step S17, when the target light intensity value A2 and the light intensity measurement value M are different according to the result of the comparison in step S16, the display brightness adjustment means adjusts the target voltage V2 of the liquid crystal cells 131r, 131g and 131b so that the light intensity measurement value M substantially coincides with the target light intensity value A2.

In step S18, the image quality correction means 81b corrects a target voltage V2 of each of the liquid crystal cells 131r, 131g and 131b, or corrects a boundary current value Im or a boundary light source duty ratio Qm of each of the laser light sources 11r, 11g and 11b, or corrects a white balance by both of them.

In step S19, feedback control (steps S14 to S19) is repeated so that the light intensity measurement value M becomes close to the target light intensity value A2.

In such a configuration, by changing a method of adjusting a display brightness B around a boundary external illuminance Pm, it is possible to display a display image with a wide range of display brightness corresponding to an external illuminance P, while driving the laser light source 11 at higher than a threshold current value Ith that stabilizes control of the laser light source 11, and it is possible to provide a head-up display device with an excellent white balance in an entire display brightness range.

Although the color sensor 30 is used to detect a laser light intensity A in the embodiment, a photodiode may be used. In this case, by switching the laser light RGB scanning over a photodiode for each frame while a synthetic laser light C scans over a photodiode, it is possible to detect a light intensity measurement value M of each of the laser light R, G and B.

Figure 12:
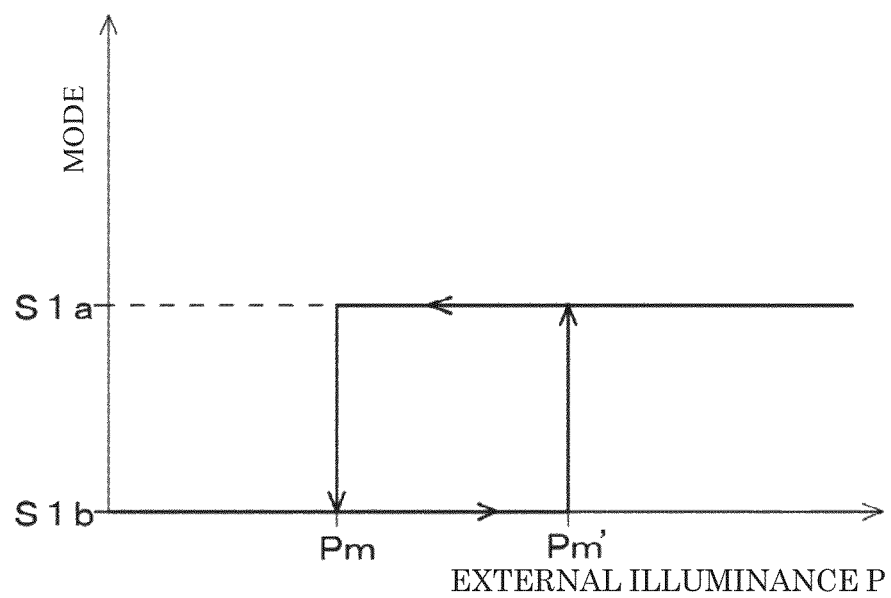
FIG. 12 is a graph showing a hysteresis at the time of switching a high brightness mode and a low brightness mode based on changes in external illuminance according to the invention.

Further, as shown in FIG. 12, a hysteresis may be given in association with the external illuminance P and the switching of a high brightness mode S1a and a low brightness mode S1b. When the external illuminance P shifts from high to low level, a boundary external illuminance Pm switches from a high brightness mode S1a to a low brightness mode S1b. However, when the external illuminance P shifts from low to high level, a boundary external illuminance Pm' may switch from a low brightness mode S1b to a high brightness mode S1a. In such a configuration, when the external illuminance P fluctuates around the boundary external illuminance Pm, it is possible to prevent the switching of high brightness mode S1a and low brightness mode S1b from becoming complicated.

Further, as shown in FIG. 13 (a), it is possible to previously store the drive current-laser light intensity characteristics data, to detect a temperature of each of the laser diodes 11r, 11g and 11b by a thermistor or the like, and to read a data table close to the detected temperature. In such a configuration, it is possible to accurately adjust the boundary current value Im of the laser light source 11 to ImA, ImB, ImC and ImD according to temperatures for displaying a display image at a desired display brightness.

Further, as shown in FIG. 13 (b), it is possible to use a light source duty ratio-laser light intensity characteristics data table for a plurality of temperatures.

Hereinafter, modifications of the embodiment will be explained with reference to FIGS. 14 to 17.

Second Embodiment

Figure 14:
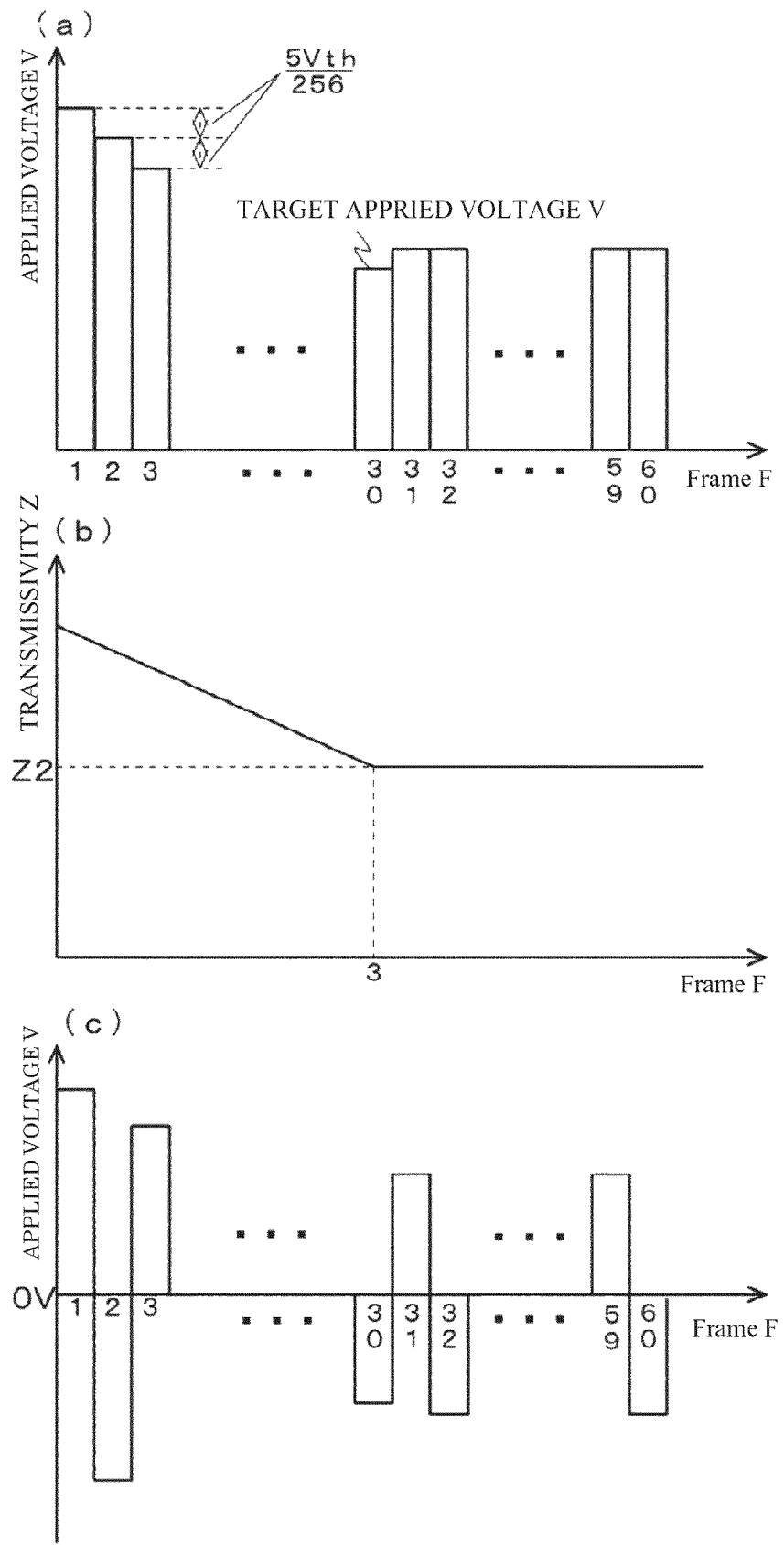
FIG. 14 shows graphs showing a transition of applied voltage and transmissivity of a polarization control element for each frame in a second embodiment of the invention, (a) showing a transition of applied voltage for each frame, (b) showing a transition of transmissivity of a polarization unit for each frame, and (c) showing a transition of applied voltage for each frame when the applied voltage is inverted for each frame.

FIG. 14 shows examples that an applied voltage V of each of liquid crystal cells 131r, 131g and 131b is gradually changed at a rate of five steps per frame. FIG. 14 (a) shows a transition of the applied voltage V of each of the liquid crystal cells 131r, 131g and 131b for each frame F, in which a change amount of the applied voltage V per frame is set to 5Vth/256, and is continuously modulated until reaching a target voltage value V2, at which the transmissivity Z of the polarization plate 14 becomes a target transmissivity Z2. On and after the frame (the 30th frame in FIG. 14) next to the one reaching the target voltage value V2, a light intensity measurement value M of the laser diode 11 to be input to the color sensor 30 is measured, and feedback control is performed, thereby modifying the target voltage value V2.

FIG. 14 (b) shows a transition of a transmissivity Z of RGB laser light for each frame F when an applied voltage V is shifted as in FIG. 14 (a). When a liquid crystal panel is used as a polarization control element 13 as in the embodiment, the liquid crystal panel is alternately driven by reversing the applied voltage V to positive and negative for each frame as shown in FIG. 14 (c) to prevent a polarization phenomenon.

In the second embodiment, an applied voltage V is gradually changed. However, a drive current I or a light source duty ratio Q may be gradually changed by controlling the laser light source 11 by pulse amplitude modulation (PAM) or pulse width modulation (PWM), to thereby control to obtain a desired laser light intensity A.

In such a configuration, when brightness is changed in multiple steps, a rapid brightness change discomforting a driver does not occur.

Third Embodiment

Figure 15:
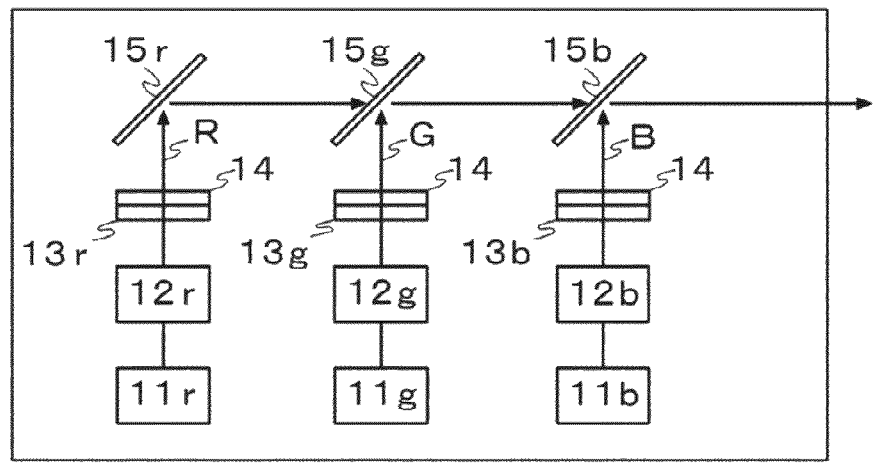
FIG. 15 is a block diagram of a synthetic laser light generation unit in a third embodiment of the invention.

Although the liquid crystal panel 13 is divided into three liquid crystal cells (polarization controllable regions) 131r, 131g and 131b for RGB laser light, and each cell is controlled, the liquid crystal panel 13 may be provided for each laser diode 11 as shown in FIG. 15. By providing a liquid crystal panel independently for each laser diode as above, it is possible to suppress interference by light by other laser diodes, and to more reliably adjust a laser light intensity and white balance for each laser light source.

Fourth Embodiment

Figure 16:
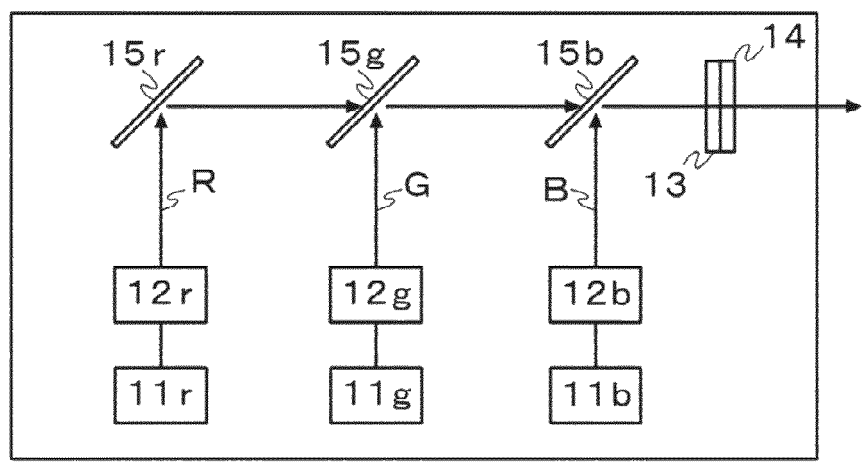
FIG. 16 is a block diagram of a synthetic laser light generation unit in a fourth embodiment of the invention.

As shown in FIG. 16, the polarization control element 13 may be provided on an optical path of a synthetic laser light C obtained by synthesizing RGB laser light by the dichroic mirrors 15r, 15g and 15b. In such a configuration, it is possible to share the polarization control element and polarization unit in a plurality of laser light sources, and to provided a head-up display device with reduced costs compared with the embodiments described above.

Fifth Embodiment

Figure 17:
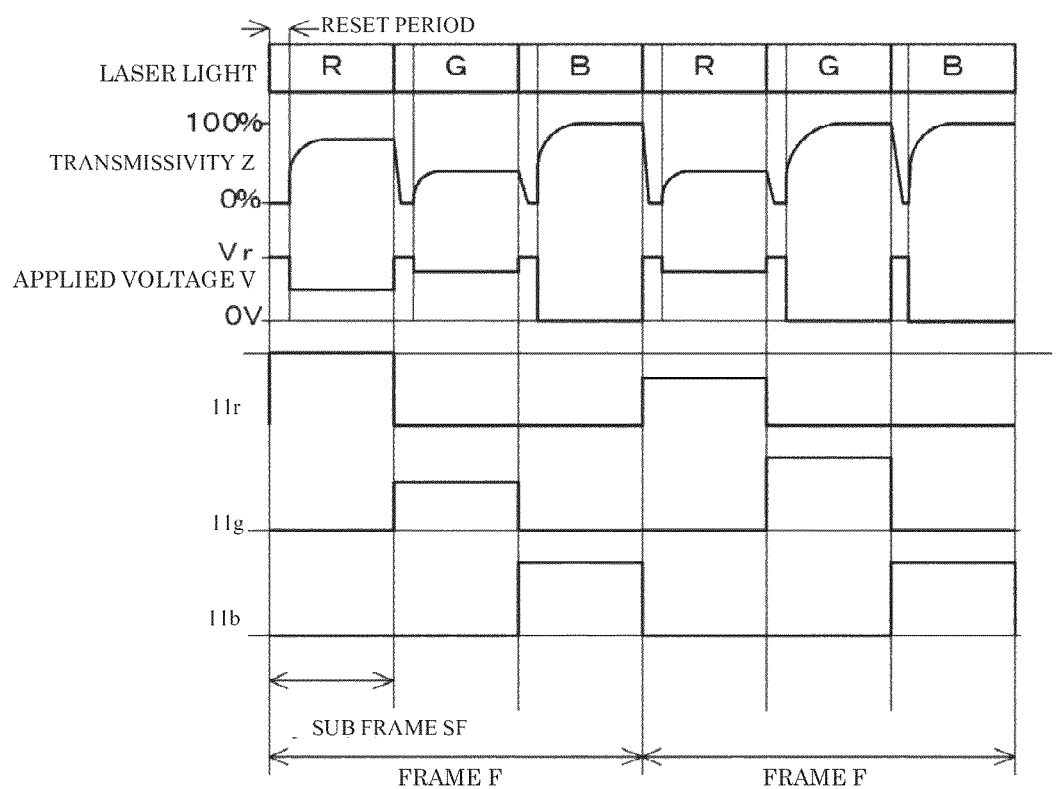
FIG. 17 is a waveform chart of a polarization control element and a laser light source in a fifth embodiment of the invention.

As shown in FIG. 17, in the configuration of the HUD device 1 of the above fourth embodiment, each of the laser diode 11r, 11g and 11b may be driven for each sub-frame SF obtained by timely dividing a frame, and a polarization control element may be configured to adjust a polarization angle for each of incoming laser diodes 11r, 11g and 11b.

In such a configuration, it is possible to provide a HUD device, which displays an image with a display brightness suitable for external illuminance, and reduces the costs while preferably controlling a white balance, by using single liquid crystal control element for a plurality of laser light sources, and adjusting a polarization angle according to wavelengths or individual errors of laser light sources.

INDUSTRIAL APPLICABILITY

A head-up display device according to the invention can be applied as a head-up display device, which irradiates a display light indicating an image to a windshield of an automobile, for example, and superimposes the light on a background scenery as an virtual image for visual recognition.

DESCRIPTION OF REFERENCE NUMERALS

1 Head-up display device (HUD device)
2 Vehicle
3 Windshield
4 Vehicle driver
5 Vehicle ECU
10 Synthetic laser light generation unit
11 Laser light source (Laser diode)
11r Red laser diode
11g Green laser diode
11b Red laser diode
12 Condensing optical system
12r Condensing lens
12g Condensing lens
12b Condensing lens
13 Polarization control element (Liquid crystal panel)
131r Polarization controllable region (Liquid crystal cell)
131g Polarization controllable region (Liquid crystal cell)
131b Polarization controllable region (Liquid crystal cell)
14 Polarization unit (Polarization plate)
15 Dichroic mirror
20 Scanning unit (MEMS scanner)
30 Laser light detection unit (Color sensor)
40 Transmissive screen
50 Reflection unit
51 Plane mirror
52 Magnifying mirror
60 Housing
61 Window part
70 External light detection unit (Light sensor)
80 Control unit
81 Microcomputer
81a Display brightness adjustment means
81b Image quality correction means
82 Laser light control unit
83 Polarization control unit
90 MEMS driver
R Red laser light
G Green laser light
B Blue laser light
C Synthetic laser light
D Display image
J Display light
X Virtual image
En Scanning possible range
Rp Display area
LH High brightness region
LL Low brightness region
A Laser light intensity
A1 Target light intensity
Am Boundary light intensity
Ath Threshold light intensity value
B Display brightness
B1 Target brightness value (High brightness region)
B2 Target brightness value (Low brightness region)
Bm Boundary display brightness
I Drive current value
I1 Target current value (High brightness region)
Im Boundary current value
Ith Threshold current value
M Light intensity measurement value
P External illuminance
P1 External illuminance measurement value (High brightness region)
P2 External illuminance measurement value (Low brightness region)
Pm Boundary external illuminance
Pth Threshold external illuminance value
Q Light source duty ratio
Q1 Target light source duty ratio (High brightness region)
Qm Boundary light source duty ratio
V Applied voltage
V2 Target voltage
Z Transmissivity
Z2 Target transmissivity (Low brightness region)

The invention claimed is:

1. A head-up display device comprising:
a laser light source for emitting laser light;
a laser light control unit for controlling a light intensity of the laser light;
a polarization control element for polarizing the laser light, and
a polarization control unit for optionally controlling a polarization angle of the laser light in the polarization control element;
a polarization unit for transmitting a specific polarization component;
a scanning unit, which is located on an optical path of laser light emitted from the laser light source, scans an arrived laser light, and projects a desired display image;
a laser light detection unit for detecting the light intensity of the laser light;
an external light detection unit for detecting illuminance of external light; and
a display brightness adjustment means, which calculates a target brightness value to display the display image based on an external illuminance measurement value measured by the external light detection unit, and controls the laser light control unit and the polarization control unit, so that the display image is displayed at the target brightness value, wherein the display brightness adjustment means controls a polarization angle of the polarization control element to a polarization angle that the laser light is not dimmed in the polarization unit, via the polarization control unit, when the external illuminance measurement value is a predetermined boundary external illuminance or higher, and controls a polarization angle of the polarization control element to a polarization angle that the laser light is dimmed in the polarization unit, via the polarization control unit, when the external illuminance measurement value is the boundary external illuminance or lower.

2. The head-up display device according to claim 1, further comprising an image quality correction means for correcting a white balance of the display image.

3. The head-up display device according to claim 2, wherein the image quality correction means corrects a white balance of the display image by controlling a light intensity of the laser light source via the laser light control unit.

4. The head-up display device according to claim 2, wherein
the image quality correction means corrects a white balance of the display image by controlling a polarization angle of the polarization control element via the polarization control unit.

5. The head-up display device according to claim 1, wherein a drive current value of the laser light source is set to a value greater than a threshold current value of the laser light source.

6. The head-up display device according to claim 1, wherein the laser light control unit controls the laser light source by PAM driving or PWM driving, so that a light intensity gradually becomes a desired level.

7. The head-up display device according to claim 1, wherein the polarization control unit gradually changes a level of applied voltage of the polarization control element.

8. The head-up display device according to claim 1, wherein the laser light source comprises a plurality of laser light sources with different wavelengths.

9. The head-up display device according to claim 8, wherein the polarization control element comprises a plurality of independently controllable polarization controllable regions.

10. The head-up display device according to claim 8, wherein the polarization control element and the polarization unit are provided for each of the laser light sources.

11. The head-up display device according to claim 8, wherein the polarization control element and the polarization unit are provided on an optical path of synthetic laser light obtained by synthesizing laser light emitted from the plurality of laser light sources with different wavelengths.

12. The head-up display device according to claim 8, wherein the synthetic laser light is obtained by emitting laser light sources with different wavelengths for each sub-frame obtained by timely dividing a frame, and the polarization control unit controls a polarization angle of the polarization control element for the each sub-frame.

13. A head-up display device comprising:
a laser light source for emitting laser light, and
a laser light control unit for controlling a light intensity of the laser light;
a polarization control element for polarizing the laser light, and
a polarization control unit for optionally controlling a polarization angle of the laser light in the polarization control element;
a polarization unit for transmitting a specific polarization component;
a scanning unit, which is located on an optical path of laser light emitted from the laser light source, scans an arrived laser light, and projects a desired display image;
a laser light detection unit for detecting the light intensity of the laser light;
an external light detection unit for detecting illuminance of external light; and
a display brightness adjustment means, which calculates a target brightness value to display the display image based on an external illuminance measurement value measured by the external light detection unit, and controls the laser light control unit and the polarization control unit, so that the display image is displayed at the target brightness value, wherein
the display brightness adjustment means comprises:
a high brightness control mode that adjusts the display image brightness to the target brightness value by controlling a laser light intensity of the laser light source, via the laser light control, when the external illuminance measurement value is a predetermined boundary external illuminance or higher; and
a low brightness control mode that adjusts the display image brightness to the target brightness value by controlling a laser light intensity of the laser light source, via the laser light control unit, when the external illuminance measurement value is the boundary external illuminance or lower.

\* \* \* \* \*